(12) United States Patent
Stemple et al.

(10) Patent No.: US 12,718,328 B2
(45) Date of Patent: Aug. 25, 2026

(54) DATA PROCESSING APPARATUS AND METHOD FOR CONCEALING PRIVATE IMAGE REGIONS

(71) Applicant: Sony Interactive Entertainment Inc., Tokyo (JP)

(72) Inventors: Lloyd Preston Stemple, London (GB); Sahin Serdar Kocdemir, London (GB); Andrew William Walker, London (GB); Christopher William Henderson, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 263 days.

(21) Appl. No.: 18/327,959

(22) Filed: Jun. 2, 2023

(65) Prior Publication Data

US 2023/0401683 A1 Dec. 14, 2023

(30) Foreign Application Priority Data

Jun. 9, 2022 (GB) ..................................... 2208443

(51) Int. Cl.
*G06T 5/50* (2006.01)
*G06T 7/70* (2017.01)
*G06V 10/44* (2022.01)

(52) U.S. Cl.
CPC .................. *G06T 5/50* (2013.01); *G06T 7/70* (2017.01); *G06V 10/44* (2022.01); *G06T 2207/20221* (2013.01); *G06V 2201/07* (2022.01)

(58) Field of Classification Search
CPC ... G06T 5/50; G06T 7/70; G06T 2207/20221; G06T 5/70; G06T 5/77; G06T 7/0002; G06T 7/10; G06V 10/44; G06V 2201/07; G06V 10/82; G06V 20/70; G06V 20/20; G06V 20/46; G06V 20/62; G06F 18/24
See application file for complete search history.

(56) References Cited

U.S. PATENT DOCUMENTS 9,165,605 B1 * 10/2015 Friedman ....... H04N 21/440245
9,547,838 B2 * 1/2017 Larsen .................... G06T 15/04
(Continued)

FOREIGN PATENT DOCUMENTS

EP 3319353 A3 6/2018

OTHER PUBLICATIONS

"How to Remove Objects and People in Photoshop CC (Fast Tutorial)", Published 2016, available for viewing at: https://www.youtube.com/watch?v=_WLXNLx8XE0, herein referred to as Photoshop_Video_1 (Year: 2016).*
(Continued)

*Primary Examiner* — Hai Tao Sun
*Assistant Examiner* — Thomas John Foster
(74) *Attorney, Agent, or Firm* — Kilpatrick Townsend & Stockton LLP

(57) ABSTRACT

A data processing apparatus includes circuitry configured to: receive an image of a user in an environment; detect an object in the image; perform one of a plurality of user-selectable processes associated with the object, each of the plurality of user-selectable processes being associated with hiding a visual characteristic of the object in the image; and after the one of the plurality of user-selectable processes has been performed, transmit data representing the image.

13 Claims, 8 Drawing Sheets

(56) References Cited

U.S. PATENT DOCUMENTS

| | | | | |
|---|---|---|---|---|
| 9,854,206 | B1 * | 12/2017 | Ren | H04N 7/147 |
| 10,043,014 | B1 | 8/2018 | Hadsall | |
| 10,503,935 | B1 | 12/2019 | Hadsall | |
| 2018/0174299 | A1 * | 6/2018 | Agrawal | H04N 13/106 |
| 2020/0298113 | A1 * | 9/2020 | Smithers | G06T 19/20 |
| 2020/0395105 | A1 | 12/2020 | Koby | |
| 2022/0058394 | A1 * | 2/2022 | Tang | G08B 13/19686 |
| 2022/0180105 | A1 * | 6/2022 | Chen | G06K 7/1417 |
| 2022/0319172 | A1 * | 10/2022 | Ramanathan | G06T 7/248 |

OTHER PUBLICATIONS

"How to Adjust & Change Facial Features in Photoshop", Published Apr. 27, 2021, available for viewing at: https://www.youtube.com/watch?v=Q3Cth54qynA, herein referred to as "Photoshop_Video_2" (Year: 2021).*

"A Tour of the Best Object Removal Tools in Photoshop | Object Removal 01"; Published Oct. 2021; https://www.youtube.com/watch?v=52HM39RIN6A (Year: 2021).*

Combined Search and Examination Report for corresponding GB Application No. 2208443.8, 8 pages, dated Dec. 12, 2023.

Yan Tsishko: "How to blur Objects in Real-Time with Video and Canvas" ITNEXT, https://itnext.io/how-to-blur-objects-in-real-time-with-video-and-canvas-898cddco1ae6, 24 pages, Aug. 31, 2021 (For relevancy see non-pat. lit. #1).

* cited by examiner

| Object Type | Action(s) |
| --- | --- |
| Document | Recommend remove |
| Photograph | Replace with avatar |
| Painting | Blur |
| Window | Recommend close blind |

Fig. 5

DATA PROCESSING APPARATUS AND METHOD FOR CONCEALING PRIVATE IMAGE REGIONS

BACKGROUND

Field of the Disclosure

This disclosure relates to a data processing apparatus and method.

Description of the Related Art

The "background" description provided is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Interactive content such as video games are becoming increasingly sophisticated. For example, it is becoming increasingly common for users in different geographical locations to play games with other users in real time over a network such as the internet. As well as playing the game together (e.g. by each user controlling a respective character in a virtual world), users are able to communicate with each other during the game. For instance, users may communicate via an audio channel. This allows each user to speak to and listen to words spoken by each of the other users. This can enhance the game experience.

It is also envisaged that users may wish to communicate with other users via a video channel (for example, in addition to the audio channel). This allows each user to see a real time video image of each of the other users. This may further enhance the game experience.

A problem, however, is that the real time video of a user shared with other users in the game (who the user may or may not personally know) may include images of objects in the room the user is in which the user may not wish other users in the game to see. For example, there may be other people in the room (such as family members of the user) who do not wish for their face to be visible in the real time video to other users. There may also be personal identifiable information (PII) of the user visible in the room (e.g. confidential letters, identity documents, financial documents or the like) which the user does not wish to share with other users. Other visual cues in the room may also give away information about the user. For instance, if a window to the outside is captured in images forming the real time video, the view from the window might give a clue to the user's real life location. There may also be concerns regarding the sharing of copyrighted material. For instance, visual material such as books, images or videos may appear in the background and these may be subject to copyright.

When playing a game and starting a live video feed, it can be difficult for a user to remember to check the field of view of the camera capturing the live video feed and to remove or obscure objects in the room which they do not wish to appear in the live video. Furthermore, a user may not be aware that a particular object is likely to give away information about the user which they may not want to share with other users. There is a desire to address this problem.

SUMMARY

The present disclosure is defined by the claims.

BRIEF DESCRIPTION OF THE DRAWINGS

Non-limiting embodiments and advantages of the present disclosure are explained with reference to the following detailed description taken in conjunction with the accompanying drawings, wherein:

FIG. 5 illustrates example types of detectable object in the image and associated actions;

Like reference numerals designate identical or corresponding parts throughout the drawings.

DETAILED DESCRIPTION OF THE EMBODIMENTS

Figure 1:
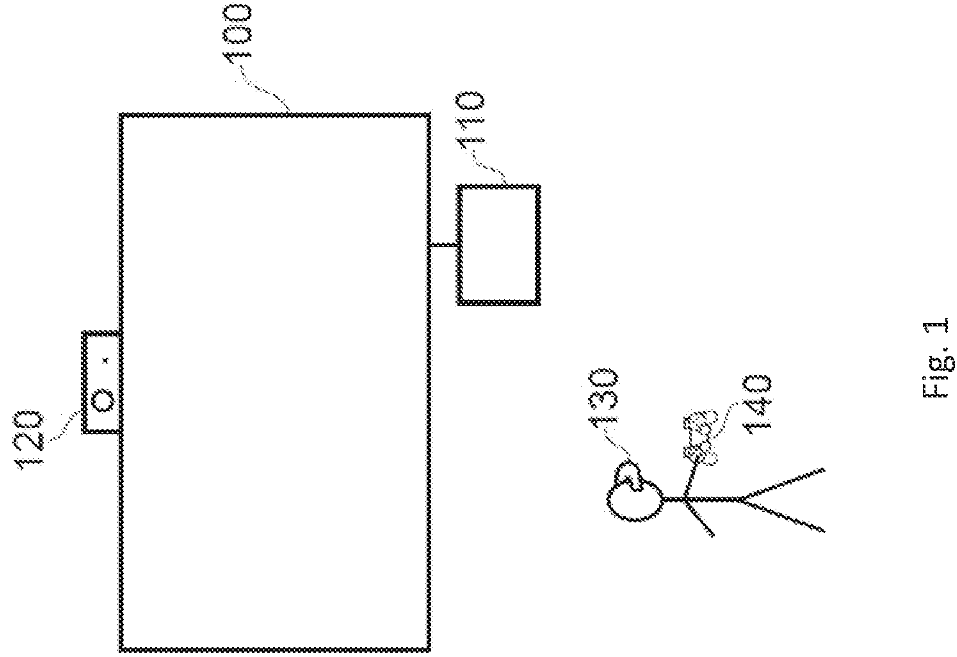
FIG. 1 schematically illustrates an example entertainment system.

FIG. 1 schematically illustrates an entertainment system suitable for implementing one or more of the embodiments of the present disclosure. Any suitable combination of devices and peripherals may be used to implement embodiments of the present disclosure, rather than being limited only to the configuration shown.

A display device 100 (e.g. a television or monitor), associated with a games console 110, is used to display content to one or more users. A user is someone who interacts with the displayed content, such as a player of a game, or, at least, someone who views the displayed content. A user who views the displayed content without interacting with it may be referred to as a viewer. This content may be a video game, for example, or any other content such as a movie or any other video content. The games console 110 is an example of a content providing device or entertainment device; alternative, or additional, devices may include computers, mobile phones, set-top boxes, and physical media playback devices, for example. In some embodiments the content may be obtained by the display device itself—for instance, via a network connection or a local hard drive.

One or more video and/or audio capture devices (such as the integrated camera and microphone 120) may be provided to capture images and/or audio in the environment of the display device. While shown as a separate unit in FIG. 1, it is considered that such devices may be integrated within one or more other units (such as the display device 100 or the games console 110 in FIG. 1).

In some implementations, an additional or alternative display device such as the head-mountable display (HMD) 130 may be provided. Such a display can be worn on the head of a user, and is operable to provide augmented reality or virtual reality content to a user via a near-eye display screen. A user may be further provided with a controller 140 which enables the user to interact with the games console 110. This may be through the provision of buttons, motion sensors, cameras, microphones, and/or any other suitable method of detecting an input from or action by a user.

Figure 2B:
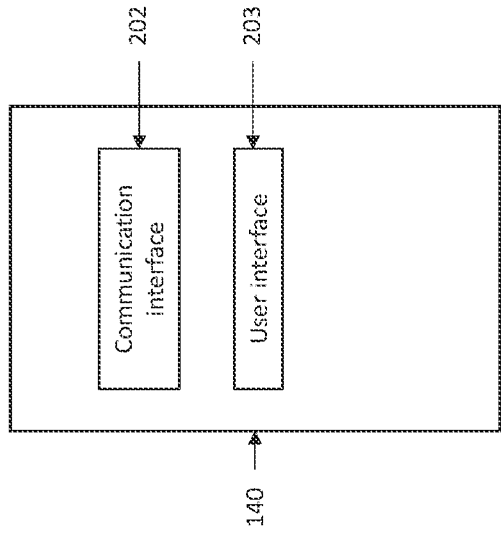
FIGS. 2A and 2B schematically illustrate example components of the entertainment system.
Figure 2A:
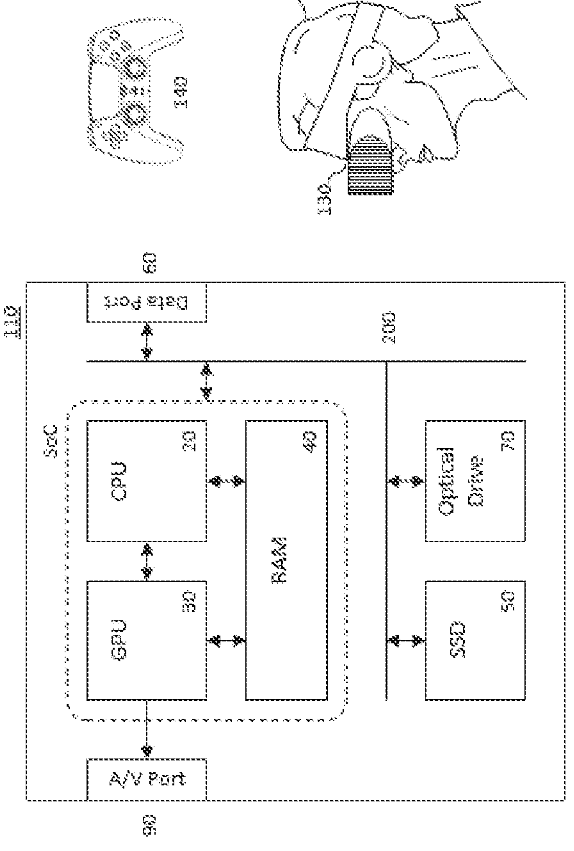

FIG. 2A shows an example of the games console 110. An example is the Sony® PlayStation 5® (PS5).

The games console 110 comprises a central processing unit or CPU 20. This may be a single or multi core processor, for example comprising eight cores as in the PS5. The games console also comprises a graphical processing unit or GPU 30. The GPU can be physically separate to the CPU, or integrated with the CPU as a system on a chip (SoC) as in the PS5.

The games console also comprises random access memory, RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive (SSD), or an internal SSD as in the PS5.

The games console may transmit or receive data via one or more data ports 60, such as a universal serial bus (USB) port, Ethernet® port, WiFi® port, Bluetooth® port or similar, as appropriate. It may also optionally receive data via an optical drive 70.

Interaction with the games console is typically provided using one or more instances of the controller 140, such as the DualSense® handheld controller in the case of the PS5. In an example, communication between each controller 140 and the games console 110 occurs via the data port(s) 60.

Audio/visual (A/V) outputs from the games console are typically provided through one or more A/V ports 90, or through one or more of the wired or wireless data ports 60. The A/V port(s) 90 may also receive audio/visual signals output by the integrated camera and microphone 120, for example. The microphone is optional and/or may be separate to the camera. Thus, the integrated camera and microphone 120 may instead be a camera only. The camera may capture still and/or video images.

Where components are not integrated, they may be connected as appropriate either by a dedicated data link or via a bus 200.

As explained, examples of a device for displaying images output by the game console 110 are the display device 100 and the HMD 130. The HMD is worn by a user 201. In an example, communication between the display device 100 and the games console 110 occurs via the A/V port(s) 90 and communication between the HMD 130 and the games console 110 occurs via the data port(s) 60.

FIG. 2B shows some example components of the controller 140. The controller comprises a communication interface 202 for transmitting wireless signals to and/or receiving wireless signals from the games console 110 (e.g. via data port(s) 60) and a user interface 203 for receiving input from the user (e.g. comprising one or more of buttons, motion sensor(s), camera(s), microphone(s) or the like, as previously described). The communication interface 202 and user interface 203 are controlled by suitable control circuitry (not shown) of the controller 140.

As discussed, to enhance involvement in a video game, a user may wish to share images of themselves as they are participating in the video game with other users participating in the view game in different geographical locations. In this case, for example, each user has their own games console 110 and the games consoles of the users are connected over a network such as the internet (e.g. via the data port 60 of each games console). Images captured of each user (e.g. by the integrated camera and microphone 120) are then shared with the other users over the network. For example, a live video feed of each user may be captured as they play the game and shared with the other users playing the game. This may enhance the user's experience. However, it may not be appropriate or safe for all objects in the room with the user to appear in the captured images which are shared.

Figure 3:
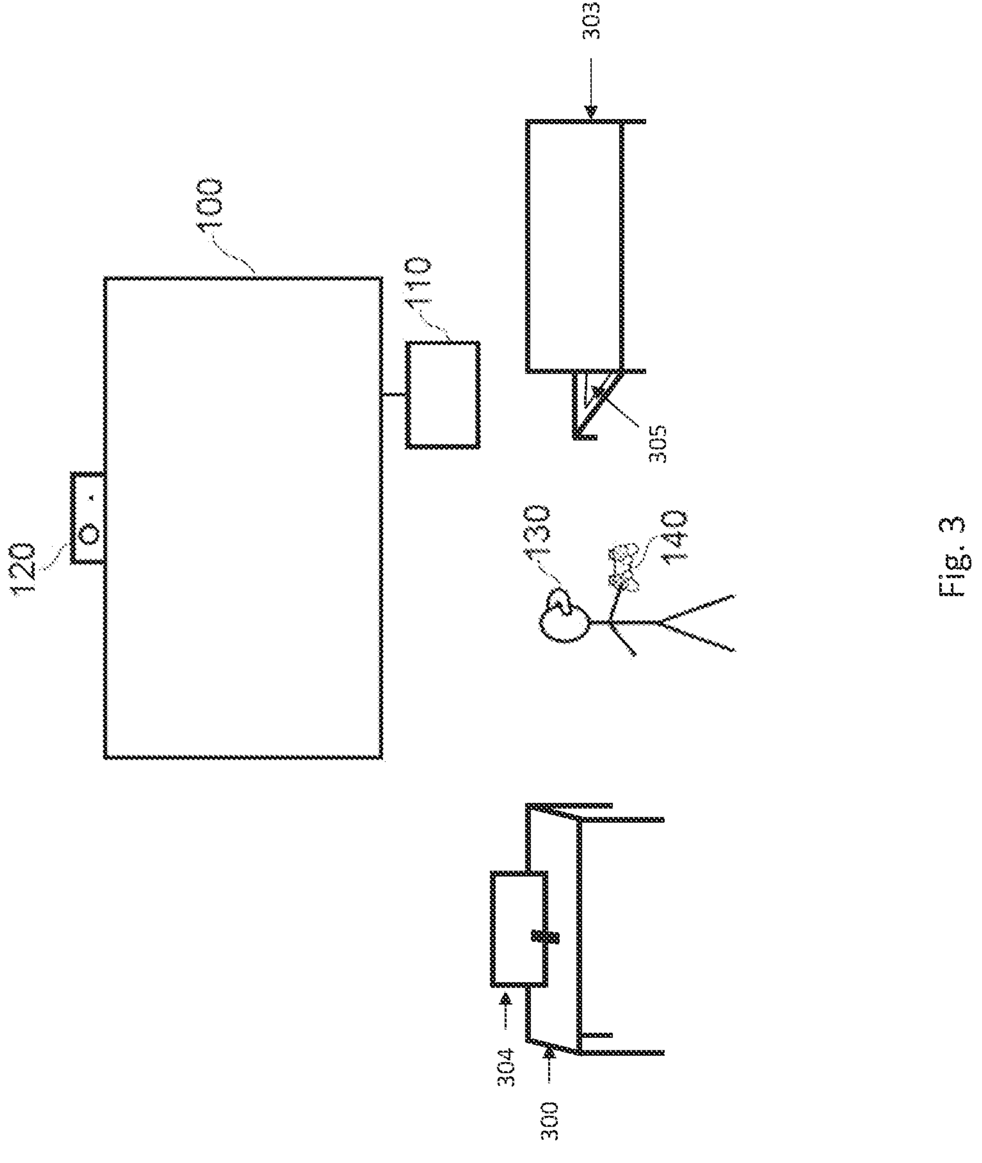
FIG. 3 schematically illustrates a user using the entertainment system in a room environment.

This is illustrated in FIG. 3, which shows a user using the entertainment system of FIG. 1 in a room. The room comprises various items including items the user may not want to be visible in images captured by the integrated camera and microphone 120. These include a photograph 304 placed on a table 300 and a document 305 placed on a couch 303. The present technique enables objects like the photograph 304 and document 305 to be recognised and appropriate action to be taken depending on the nature of those objects.

An example of the present technique is described below. This example is carried out under the control of the CPU 20 of the games console 110, for example.

Figure 4:
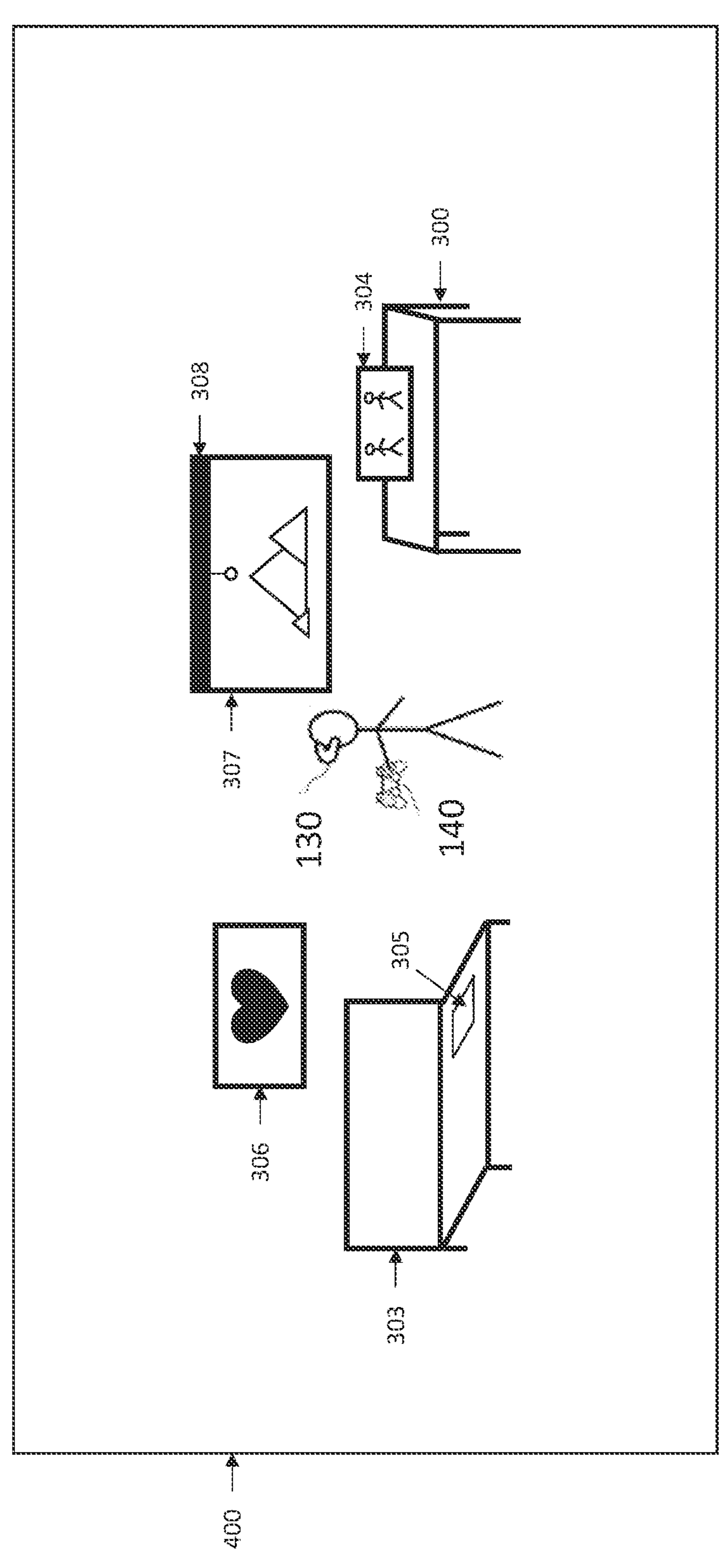
FIG. 4 schematically illustrates a captured image of the room environment.

FIG. 4 shows an image 400 of the room captured by the integrated camera and microphone 120. The image includes the user together with the photograph 304 and document 305. In addition, the image includes a painting 306 and a window 307 with a window blind 308. The painting and window 307 are located on a back wall of the room and are not visible from the point of view shown in FIG. 3.

Each of the photograph 304, document 305, painting 306 and window 307 are objects which the user may not wish to appear in images captured by the integrated camera and microphone 120 and shared with other users when playing a game.

The photograph 304 may contain faces and/or other visual information of friends and/or family of the user. To protect the identity of these people, it may thus not be appropriate for the people in the photograph to be discernible in the captured image 400.

The document 305 may contain PII which could be used to identify the user. For example, the document may be a bank statement or other confidential document comprising text detailing sensitive personal information about the user such as their full name, address and bank account information. To protect the identity of the user and prevent their details for being used for fraud, for example, it may thus not be appropriate for the text of this document to be discernible in the captured image 400.

The painting 306 may not indicate information from which the user (or their family and/or friends) may be identified. However, the painting may be subject to copyright (and/or other intellectual property right(s)) and thus it may be appropriate for the user to prevent it from appearing in a captured image which is then widely shared. To protect the copyright owner of the painting, it may thus not be appropriate for visual details of the painting to be discernible in the captured image 400.

The view from the window 307 may give visual clues to the user's geographical location. For example, if a landscape viewable through the window includes one or more visually unique features (e.g. a specific mountain range, a specific forest, a specific building or the like), another user who views a captured image including the window 307 and the visually unique feature of the view through the window will be able to determine the geographical location of the room with the window relative to this visually unique feature. To stop the real life geographical location of the user's home being identified, for example, it may thus not be appropriate for the view from the window 307 to be discernible in the captured image 400.

This is a simplified example and, in reality, the room may include a larger number and variety of items (including further types of items, such as electronic displays (e.g. TV, laptop, tablet or smartphone displays) showing PII of the user or copyrighted material, which the user may not wish to be visible to other users in the captured image 400).

The image 400 is a two-dimensional (2D) image and represents a 2D virtual reconstruction of the room. In another example, multiple images of the room may be captured from different perspectives (e.g. using multiple cameras) to generate a three-dimensional (3D) version of the image 400 (e.g. a stereoscopic image) representing a 3D virtual reconstruction of the room. For ease of explanation, examples using a 2D version of image 400 are described. However, it will be appreciated the described principles could also be applied to a 3D version of image 400.

Once the image 400 has been captured, each of the photograph 304, document 305, painting 306 and window 307 in the image 400 are detected. This is achieved using any suitable object detection technique. For example, the image 400 may be segmented and each segment input to a convolutional neural network implemented by the CPU 20 and/or GPU 30 of the games console and/or a server (not shown) connected to the games console over a network (e.g. the internet) via the data port(s) 60.

The convolutional neural network may have been previously trained to detect various types object which users commonly do not wish to be discernible in captured images to be shared with other users (e.g. for privacy and/or copyright reasons). In this example, the convolutional neural network will therefore have been trained to identify images comprising a photograph, images comprising a document, images comprising a painting and images comprising a window. The photograph 304 will therefore be detected in a segment of the image 400 in which the photograph 304 appears. This is referred to as the photograph segment. The document 305 will be detected in a segment of the image 400 in which the document 305 appears. This is referred to as the document segment. The painting 306 will be detected in the segment of the image 400 in which the painting 306 appears. This is referred to as the painting segment. The window 307 will be detected in the segment of the image 400 in which the window 307 appears. This is referred to as the window segment.

It will be appreciated that other suitable object recognition techniques could be used to identify respective ones of the photograph 304, document 305, painting 306 and window 307 in the image 400. For example, photograph detection may make use of facial recognition (e.g. using a hidden Markov model) to detect photographs with faces in (these being the sorts of photographs users are more likely to not want to share). Facial recognition (e.g. based on convolutional neural network classification or using a hidden Markov model) may also be used to detect faces of people in the image 400 other than the user (e.g. faces detected which are not within a predetermined central portion of the image) and to treat these as objects which the user may not wish to be visible in the image 400 when it is shared (thereby protecting the privacy of these other people who may be, for example, children or other family members of the user). In another example, optical character recognition (OCR) may be used to identify text and thus the location of documents in a captured image containing that text. In general, it is expected that a skilled person will use the most suitable object recognition technique for detection of a given type of object to be recognised.

For each detected type object, one or more actions associated with that object type are looked up. Each detectable object type (e.g. each object type the convolutional neural network has been trained to detect) is associated with one or more actions.

In an example, the action(s) of each detectable object type are stored in a lookup table like that shown in FIG. 5. The lookup table is formulated in advance (e.g. by a human based on known characteristic(s) of each detectable object type and an appropriate action to take if that object type is detected in the play region) and stored in the RAM 40 and/or disk 50 of the games console and/or a server (not shown) connected to the games console over a network (e.g. the internet) via the data port(s) 60, for example.

As shown in FIG. 5, the object type "Document" is associated with the action "Recommend remove". This indicates that, if a document (such as document 305) is detected in the image 400, it should be removed from the field of view of the camera which captured the image since it may contain sensitive information about the user.

The object type "Photograph" is associated with the action "Replace with avatar". This means that, if a photograph (such as photograph 304) is detected in the image 400, the photograph (or at least a portion of the detected photograph including detected faces or other identifying information of a person in the photograph) is replaced with an avatar. This allows an object to still be seen in the image 400 at the location of the photograph (meaning the image 400 still appears natural and complete) whilst, at the same time, means visual information which could be used to identify anyone in the photograph is not shared. More generally, instead of an image of an avatar (as exemplified here), any alternative image which is not associated with the user (e.g. a computer generated image such as a scene from a well-known video game, a stock photograph, an augmented reality (AR) object or the like) may be overlaid on the image of the photograph.

The object type "Painting" is associated with the action "Blur". This means that, if a painting (such as painting 306) is detected in the image 400, the painting is blurred (e.g. using a Gaussian blur function). This allows an object to still be seen in the image 400 at the location of the painting 306 (meaning the image 400 still appears natural and complete) whilst, at the same time, means visual features of the painting which may be subject to copyright are obscured.

The object type "Window" is associated with the action "Recommend close blind". This indicates that, if a window (such as window 307) is detected in the image 400, the view outside the window should be blocked (e.g. using a blind or curtain) to prevent geographical features of the view which might indicate the real life location of the user's home from being captured.

These are only examples and, in reality, a larger number of object types may be detectable and/or different action(s) may be associated with each object type. For example, the object type "Painting" could be associated with the action "Replace with avatar" instead of "Blur" (meaning the painting 306 would not be blurred but would, instead, be overlaid with an image of an avatar) and the object type "Window" could be associated with the action "Blur" instead of "Recommend close blind" (meaning the user need not leave the game to manually close the blind 308 since the view through the window 307 will appear blurred). The user may configure their preferred action for different object types. This is exemplified later.

Figure 6:
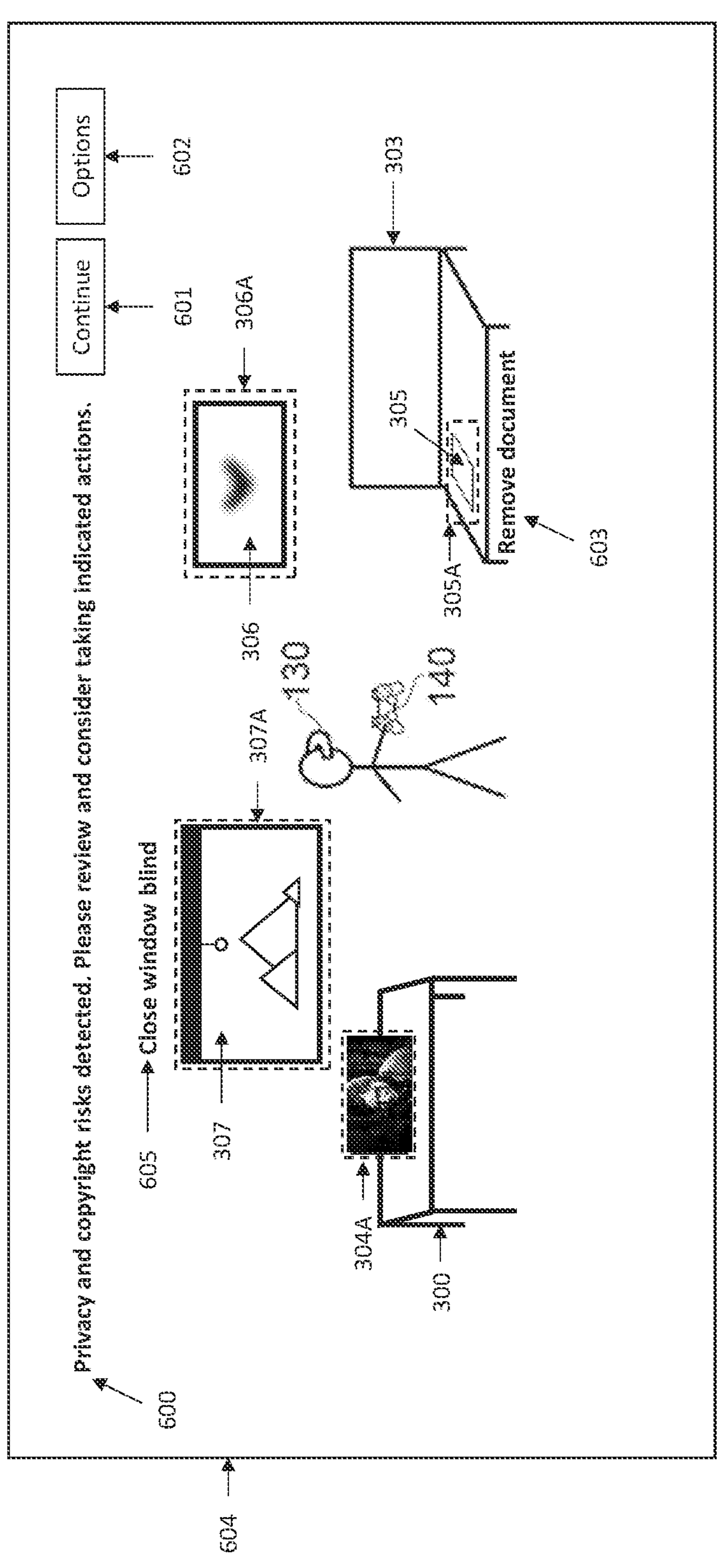
FIG. 6 schematically illustrates a modified version of the captured image.

Based on the action(s) associated with each detectable object type (e.g. according to FIG. 5) and the type of any detected object(s) in the captured image 400, feedback is provided to the user. In the example of FIG. 6, the feedback is provided in the form of a modified version 604 of the image 400. The modified image 604 is generated by the GPU 30, for example, and displayed to the user on the display device 100 and/or HMD 130. The modified image 604 may be displayed to the user in response to them activating an option to share a live video feed of themselves whilst playing the game, for example.

In this example, the modified image 604 is based on a mirror image of the image 400 so that, for example, the objects shown on the left- and right-hand sides of the image 604 correspond to the objects on the left- and right-hand sides of the user in the room (from the point of view of the user). This makes it easier for the user to quickly identify objects for which an action is indicated (since the user can use the image 604 like a mirror).

In the image 400, each of the photograph 304, document 305, painting 306 and window 307 have been detected as, respectively, object types "Photograph", "Document", "Painting" and "Window" and the action associated with each of these object types has been implemented with respect to the image.

For the photograph 304, which is detected as object type "Photograph" and thus associated with the action "Replace with avatar", an image of an avatar has been overlaid on the photograph 304 so the photograph is no longer visible in the image 604. In this example, a frame 304A surrounding the photograph 304 is overlaid on the image 604 to indicate the location of the photograph 304 as a detected object. The frame 304A defines the image segment in which the photograph 304 is detected, for example. The image of the avatar is then centred inside the frame and sized to correspond with the size of the frame.

For the document 305, which is detected as object type "Document" and thus associated with the action "Recommend remove", a frame 305A surrounding the document 305 is overlaid on the image 604 to indicate the location of the document 305 as a detected object. The frame 305A defines the image segment in which the document 305 is detected, for example. A textual message 603 indicating the recommended action ("Remove document") is overlaid on the image 604 in the vicinity of the frame 305A. The text of the textual message 603 is stored as additional data associated with the Object Type "Document" in the lookup table of FIG. 5, for example.

For the painting 306, which is detected as object type "Painting" and thus associated with the action "Blur", the portion of the image 604 including the painting 306 has been blurred (e.g. using a Gaussian blur function) so the visual features of the painting are no longer discernible in the image 604. In this example, a frame 306A surrounding the painting 306 is overlaid on the image 604 to indicate the location of the painting 306 as a detected object. The frame 306A defines the image segment in which the painting 306 is detected, for example. This image segment is then blurred. Although blurring is given as an example here, other methods of obscuring the visual features of an image by applying a suitable function (e.g. a suitable filter) to the pixel values representing those visual features may be used instead of or in addition to blurring. For example, the pixels defining the portion of the image to be obscured (e.g. the pixels inside the frame 306A) may be randomly repositioned or a portion of the pixels may be removed and replaced with an interpolation of their respective neighbouring pixels.

For the window 307, which is detected as object type "Window" and thus associated with the action "Recommend close blind", a frame 307A surrounding the window 307 is overlaid on the image 604 to indicate the location of the window 307 as a detected object. The frame 307A defines the image segment in which the window is detected, for example. A textual message 605 indicating the recommended action ("Close window blind") is overlaid on the image 604 in the vicinity of the frame 307A. The text of the textual message 605 is stored as additional data associated with the Object Type "Window" in the lookup table of FIG. 5, for example.

Instead of, or in addition to, a visual indicator (such overlaid frames 304A, 305A, 306A and 307A and textual messages 603 and 605) indicating the detected objects and/or actions, another type of indicator may be used. For example, an audio message saying "There's a document in the field of view of the camera. Consider removing it." (for the document 305) or "There's a window in the field of view of the camera. Consider closing the window blind." (for the window 307) may be output (e.g. by a loudspeaker (not shown) of the display device 100 or earphones (not shown) of the HMD 130). The visual and/or audio indicator may be accompanied by haptic feedback (e.g. vibrations of a vibrator (not shown) of the controller 140) to further alert the user to view and/or listen to the output visual and/or audio indicator, for example.

In an example, the image 400 and modified image 604 are video images which are captured and displayed to the user in real time. This enables the user to interact with the real life detected objects in the room and see this interaction reflected in the displayed image 604. For example, this allows the user to determine when the document 305 has been successfully moved out of the field of view of the camera or when the blind 308 has been sufficiently closed to obscure the view out of the window 307.

The displayed modified image 604 also includes a textual message 600 indicating to the user the reason why the detected objects have been identified in the modified image 604. The reason for this is privacy concerns (relevant to the photograph 304, document 305 and window 307) and copyright concerns (relevant to the painting 306). The textual message 600 also prompts the user to consider taking any actions which indicated ("Remove document" and "Close window blind" in this case).

To ensure the user maintains agency and choice, it is optional for the user to carry out any of the recommended actions. Once the user has (or has not) carried out the recommended actions, they may select the "Continue" virtual button 601 (e.g. by controlling a cursor (not shown) controlled by the controller 140). In response to the user selecting the "Continue" virtual button 601, the game begins and subsequent images 400 captured of the user, with relevant modifications (e.g. the overlaying of the avatar image on photograph 304 and the blurring of the painting 306), are shared in real time with other players of the game.

In one example, if the location of the detected objects in the camera's field of view do not change (since both the camera and objects are stationary, for example), modifications to each captured and shared image frame are applied to the same pixels (that is, pixels at the same horizontal and vertical position) in each successive image frame. For instance, the pixels in the photograph segment of the modified image 604 defined by frame 304A are configured to display the avatar image in every successive image frame and the pixels in the painting segment of the modified image 604 defined by the frame 306A are subjected to the same blurring process in every successive image frame.

In another example, if the location of the detected objects in the camera's field of view do change (since one or both of the camera and objects are moving, for example), each of the detected objects are tracked (using any known appropriate object tracking technique, such as a suitable Kernel-based or contour tracking technique) in successive image frames and the size and/or position of the image segment containing a given tracked object is correspondingly adjusted for each successive image frame. The relevant modifications (e.g. overlay of an avatar image in the case of the photograph segment and blurring in the case of the painting segment) are then applied to the respective adjusted image segments.

The present technique thus allows a user to be automatically alerted to the presence of objects in a camera's field of view which the user may not want other users to see before images captured by that camera are shared. Depending on the object, different actions are taken. Some actions (such as overlaying of an avatar image or blurring) involve adjustment to the images which are captured before they are shared with other users. Other actions (such as recommending an object is removed from the field of view of the camera or that a curtain blind is closed) involve recommending actions the user should take before sharing the captured images.

Figure 7:
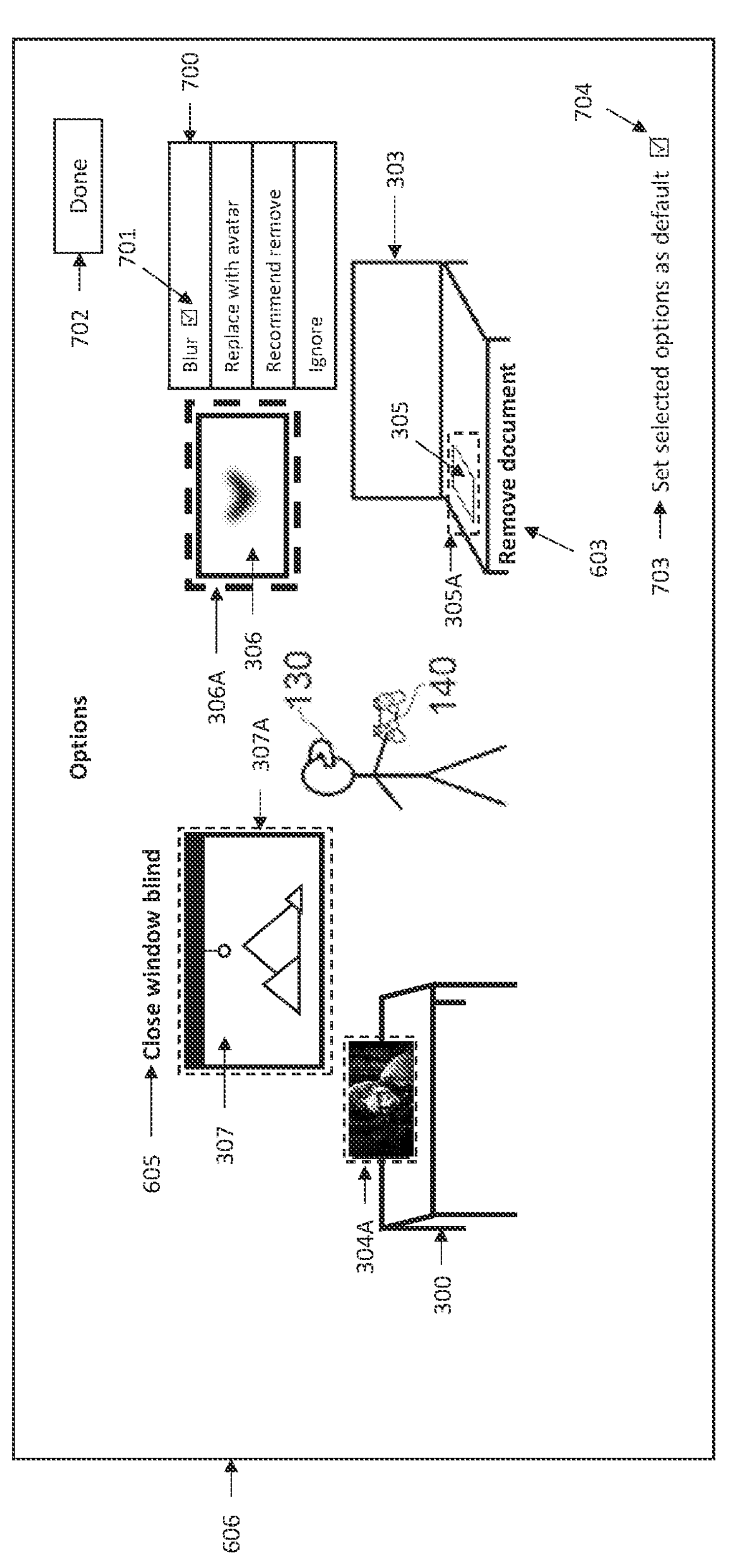
FIG. 7 schematically illustrates an interactive menu system applicable to the modified version of the captured image.

In an example, to improve user flexibility, a user may adjust the actions which are to be taken for different types of detected object. In the example of FIG. 6, this is carried out by the user selecting the "Options" virtual button 602 shown with the image 604. This causes an interactive modified image 606 to be displayed, as shown in FIG. 7. The interactive modified image 606 is the same as the modified image 604 except that an interactive user interface is implemented with respect to the image. In particular, each of the detected objects are selectable (e.g. by controlling a cursor (not shown) controlled by the controller 140). Selection of a particular object then allows the action(s) associated with that object to be selected. The interactive modified image 606 is again generated by the GPU 30, for example, and displayed to the user on the display device 100 and/or HMD 130.

In FIG. 7, this is exemplified with the painting 306 (which is detected as an object of type "Painting", as previously discussed). The painting 306 has been selected by the user and this is indicated to the user by the frame 306A appearing in a different manner (in this example, with a thicker line) than the frames 304A, 305A and 307A of the other detected objects. A selectable menu 700 of actions is also displayed. Each action in the menu may be stored as a selectable action associated with the object "Painting", together with the action which is currently selected. For example, the table of FIG. 5 may contain an additional column (not shown) indicating all selectable actions associated with a given object type together with the currently selected action (currently shown in the rightmost column of the table of FIG. 5).

The selectable actions in the menu 700 are "Blur", "Replace with avatar", "Recommend remove" and "Ignore". The currently selected action is indicated by a check mark 701. "Blur" is the currently selected action here. "Blur" is explained above. "Replace with avatar" was explained with respect to the object type "Photograph" and, if selected, causes an image of an avatar to be overlaid on the painting segment of the captured image to hide the painting (in the same way as described for the photograph 304, for example). "Recommend remove" was explained with respect to the object type "Document" and, if selected, causes a textual message indicating the recommended action (e.g. remove "Remove painting") to be overlaid on the image in the vicinity of the frame 306A (in the same way as described for the document 305, for example). "Ignore" means the painting 306 is ignored and no action is taken regarding this object. Thus, the portion of the image including the painting 306 (e.g. that defined by the frame 306A) is not modified and no recommended action regarding the painting 306 (e.g. an indication to remove the object) is given. The user may select this option if the painting is their own and they are happy for reproductions of it to be shared with other users, for example.

The user selects the desired one of the selectable actions of the menu 700 by, for example, controlling a cursor (not shown) controlled by the controller 140 or by scrolling through the menu using a joystick or directional pad (not shown) of the controller 104. As the cursor is moved over the different selectable actions of the menu or as the different selectable actions of the menu are scrolled through (with the current scrolled-to action of the menu being distinguished from the other actions of the menu by suitable highlighting or the like), a preview associated with the selected action may be implemented with respect to the selected detected object (in this case, the painting 306). For example, when the cursor hovers of the "Blur" option of the menu, blurring is temporarily applied to the painting 306 in the image (as shown). When the cursor hovers over the "Replace with avatar" option, the painting 306 is temporarily overlaid with an image of an avatar. When the cursor hovers over the "Recommend remove" option, a textual message indicating the recommended action (e.g. remove "Remove painting") is temporarily overlaid on the image in the vicinity of the frame 306A. Finally, when the cursor hovers over the "Ignore" option, the painting is temporarily ignored.

Once the user has made their selection (e.g. through moving a cursor or scrolling), they finalise the selection by, for example, pressing a predetermined button (not shown) on the controller 140 (e.g. the "X" button on the PS5 controller). The check mark 701 then appears next to the final selected option and the selected action is applied to the painting 306 and continues being applied to the painting 306 for the rest of the gaming session. The user may then select another detected object (e.g. the photograph 304, document 305 or window 307) in the interactive modified image 606 and select an appropriate action for this other detected object in a similar way. Each detectable object may be associated with a plurality of selectable actions which appear in a menu 700 when that object is selected. For example, the objects "Photograph" and "Document" may be associated with the same selectable actions as the object "Painting" (that is, "Blur", "Replace with avatar", "Recommend remove" and "Ignore"). On the other hand, the object "Window" may be associated with the selectable actions "Blur", "Replace with avatar" and "Recommend close blind" but have no "Recommend remove" option (since a window is a fixed feature of a building and thus cannot be removed from the field of view of the camera). In this way, the selectable actions associated with each detectable object type may be tailored depending on the characteristics of that object type.

Once the user is happy with the action to be implemented for each detected object, they select the "Done" virtual button 702 (e.g. by again controlling a cursor (not shown) controlled by the controller 140). This returns the user to the modified image 604 shown in FIG. 6. This shows the detected objects with the newly selected actions now applied. Thus, for example, if the user had selected the option "Replace with avatar" in the menu 700 for the painting 306, the painting 306 would now be shown with an image of an avatar overlaid on it (rather than being blurred). The user may then proceed with playing the game (and sharing the image 400 with the newly selected actions applied) by pressing the "Continue" virtual button 601.

The interactive modified image 606 also includes an option 703 to set the selected options as a default by checking or unchecking the check box 704 (again, using appropriate controls of the controller 140, for example). If the check box 704 is checked, the newly selected options are saved as the default options for the next time the relevant objects are detected (e.g. by being stored in the rightmost column of the table of FIG. 5). For example, if the action "Blur" is selected for the painting 306 as a detected object of type "Painting" (as shown in FIG. 7), this action is selected by default in the displayed modified image 604 for subsequently detected objects of the type "Painting" in subsequent gaming sessions. Preferred actions of the user for different types of detectable object are therefore implemented automatically in subsequent gaming sessions, thereby providing improved user convenience.

Note that, for actions which involve prompting the user to do something (e.g. "Remove document" or "Close window blind"), once the game begins, if the corresponding objects (e.g. document 305 and window 307) remain within the field of view of the camera, no action is taken and the objects appear in an unmodified form in the image which is shared. In this case, the user has been prompted to remove the objects from the field of view of the camera (by modified image 604) but has chosen not to. The user's agency and choice is therefore respected.

The present technique thus allows a user to be alerted to the presence of objects in captured images which the user may not want to be visible to other users (e.g. for privacy or copyright reasons). Furthermore, the user is able to interact with the system quickly and easily to preview and customise how such objects are dealt with.

In examples of the present technique, the detection of and implementation of appropriate action(s) for each detectable object (including, for example, the appropriate modification of captured images before they are shared with other users) may be carried out by the CPU 20 and/or GPU 30 of the games console and/or a server (not shown) connected to the games console over a network (e.g. the internet) via the data port(s) 60. It may be desirable for the necessary processing to be carried out locally (e.g. via the CPU 20 and/or GPU 30) so unmodified images containing sensitive material are not transmitted over the network (thereby improving the security of sensitive data of the user). Alternatively, to reduce the local processing load, it may be desirable for the necessary processing to be carried out by an external server. In this case, any unmodified images containing sensitive material may be encrypted before transmission (and be decryptable only by an authorised server with the relevant decryption private key) to improve the security of sensitive data of the user.

It will be appreciated that the modified image 604 may take a different form to that exemplified in FIG. 6. For example, instead of individual detected objects being indicated (e.g. through frames 304A, 305A, 306A and 307A), a translucent heat map-style image (not shown) may be overlaid on the captured image 400 indicating areas of the image which may contain objects the user might not want to be visible to other users when the image is shared. For example, the heat map-style image may comprise a continuous (or pseudo continuous, given each pixel value has a discrete mapping to a particular colour) spectrum of colours ranging from blue (indicating portion(s) of the image without any objects which the user may not want to be visible to other users) to red (indicating portion(s) of the image which are highly likely to include objects which the user may not want to be visible to other users). Furthermore, rather than detecting individual objects as being of a particular object type (e.g. "Photograph", "Document", "Painting", etc.) the system may instead indicate regions of a captured image containing objects which cannot be recognised as so-called predetermined "safe" objects (that is, objects such as furniture which the user is very unlikely to not want to be visible to other users) as regions potentially containing objects which might need to be removed from or obscured in the image.

Figure 8:
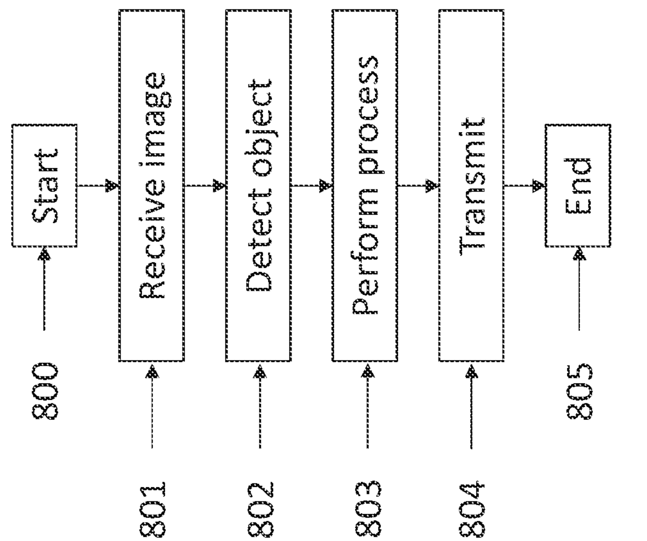
FIG. 8 schematically illustrates an example method.

A method according to the present technique is shown in FIG. 8. The method is carried out by circuitry of a data processing apparatus (e.g. the CPU 20 of the games console 110). The method starts at step 800. At step 801, an image of a user in an environment (e.g. the image 400 of the user in the room) is received. The image is captured by the camera of the integrated camera and microphone 120, for example. At step 802, an object in the image (e.g. the photograph 304, document 305, painting 306 or window 307) is detected. At step 803, one of a plurality of user-selectable processes associated with the object is performed (e.g. "Blur", "Replace with avatar" or "Recommend remove"). Each of the plurality of user-selectable processes is associated with hiding a visual characteristic of the object in the image (e.g. by blurring the object, overlaying a different image on it, such as an image of an avatar, or recommending removal of the object from the field of view of the camera which captured the image). At step 804, after the one of the plurality of user-selectable processes has been performed, data representing the image is transmitted. For example, the image (e.g. a real time video image of the user as they play a video game) is streamed from the games console 110 to another games console (not shown) of another user in a different geographical location over a network (such as the internet) via data port(s) 60. The method ends at step 805.

Embodiment(s) of the present disclosure are defined by the following numbered clauses:

1. A data processing apparatus comprising circuitry configured to:
   receive an image of a user in an environment;
   detect an object in the image;
   perform one of a plurality of user-selectable processes associated with the object, each of the plurality of user-selectable processes being associated with hiding a visual characteristic of the object in the image; and
   after the one of the plurality of user-selectable processes has been performed, transmit data representing the image.
2. A data processing apparatus according to clause 1, wherein the one of the plurality of user-selectable processes comprises modifying the image to hide the visual characteristic of the object in the image.
3. A data processing apparatus according to clause 2, wherein modifying the image comprises applying a function to pixels of the image representing the visual characteristic of the object to obscure the visual characteristic of the object.
4. A data processing apparatus according to clause 2, wherein modifying the image comprises overlaying another image on a portion of the image including the object.
5. A data processing apparatus according to clause 1, wherein the one of the plurality of user-selectable processes comprises outputting an indication to the user to remove the object from a field of view of a camera which captured the image.

6. A data processing apparatus according to clause 5, wherein the indication comprises an indication of a location of the object in the image and a message recommending removal of the object from the field of view of the camera which captured the image.

7. A data processing apparatus according to any preceding clause, wherein the circuitry is configured to:

determine the detected object as being one of a plurality of predetermined object types; and the plurality of user-selectable processes associated with the object is determined according to the one of the plurality of predetermined object types.

8. A data processing apparatus according to any preceding clause, wherein information about the user is discernible using the visual characteristic of the object in the image.

9. A data processing apparatus according to any preceding clause, wherein the visual characteristic of the object is subject to one or more intellectual property rights.

10. A data processing apparatus according to any preceding clause, wherein the image is a real time video image captured while the user is playing a video game.

11. A data processing method comprising:

receiving an image of a user in an environment;

detecting an object in the image;

performing one of a plurality of user-selectable processes associated with the object, each of the plurality of user-selectable processes being associated with hiding a visual characteristic of the object in the image; and after the one of the plurality of user-selectable processes has been performed, transmitting data representing the image.

12. A program for controlling a computer to perform a method according to clause 11.

13. A storage medium storing a program according to clause 12.

Numerous modifications and variations of the present disclosure are possible in light of the above teachings. It is therefore to be understood that, within the scope of the claims, the disclosure may be practiced otherwise than as specifically described herein.

In so far as embodiments of the disclosure have been described as being implemented, at least in part, by one or more software-controlled information processing apparatuses, it will be appreciated that a machine-readable medium (in particular, a non-transitory machine-readable medium) carrying such software, such as an optical disk, a magnetic disk, semiconductor memory or the like, is also considered to represent an embodiment of the present disclosure. In particular, the present disclosure should be understood to include a non-transitory storage medium comprising code components which cause a computer to perform any of the disclosed method(s).

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more computer processors (e.g. data processors and/or digital signal processors). The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to these embodiments. Additionally, although a feature may appear to be described in connection with particular embodiments, one skilled in the art would recognize that various features of the described embodiments may be combined in any manner suitable to implement the present disclosure.

The invention claimed is:

1. A data processing apparatus comprising circuitry configured to:

receive an image of a user in an environment;

detect a plurality of objects in the image, the plurality of objects being associated with different object types, wherein the different object types are associated with a plurality of user-selectable processes;

for each respective detected object of the plurality of objects, present, on the image a visual overlay that marks a location of the respective detected object within the image, and a message indicating a user-selectable process of the plurality of user-selectable processes at the location of the respective detected object;

present, on the image, a prompt to select a selected user-selectable process from the plurality of user-selectable processes, wherein the prompt is dynamically presented on the image and comprises the message based on an object type of an object of the plurality of objects; and generate a modified image by performing the selected user-selectable process on the image, wherein the selected user-selectable process of the plurality of user-selectable processes comprises an indication to the user to remove the object from a field of view of a camera which captured the image.

2. The data processing apparatus according to claim 1, wherein a second selected user-selectable process of the plurality of user-selectable processes comprises modifying the image to hide a visual characteristic of a second object of the plurality of objects in the image.

3. The data processing apparatus according to claim 2, wherein modifying the image comprises applying a function to pixels of the image representing the visual characteristic of the second object to obscure the visual characteristic of the second object.

4. The data processing apparatus according to claim 2, wherein modifying the image comprises overlaying another image on a portion of the image including the second object.

5. The data processing apparatus according to claim 1, wherein the circuitry is configured to: determine the detected object as being one of a plurality of predetermined object types; and the plurality of user-selectable processes associated with the object is determined according to the one of the plurality of predetermined object types.

6. The data processing apparatus according to claim 1, wherein information about the user is discernible using a visual characteristic of the object in the image.

7. The data processing apparatus according to claim 1, wherein a visual characteristic of the object is subject to one or more intellectual property rights.

8. The data processing apparatus according to claim 1, wherein the image is a real time video image captured while the user is playing a video game.

9. The data processing apparatus according to claim 1, wherein a second selected user-selectable process of the plurality of user-selectable processes comprises hiding a visual characteristic of a second object of the plurality of objects in the image.

10. A data processing method comprising:

receiving an image of a user in an environment;

detecting a plurality of objects in the image, the plurality of objects being associated with different object types, wherein the different object types are associated with a plurality of user-selectable processes;

for each respective detected object of the plurality of objects, presenting, on the image a visual overlay that marks a location of the respective detected object within the image, and a message indicating a user-selectable process of the plurality of user-selectable processes at the location of the respective detected object;

presenting, on the image, a prompt to select a selected user-selectable process from the plurality of user-selectable processes, wherein the prompt is dynamically presented on the image and comprises the message based on an object type of an object of the plurality of objects; and generating a modified image by performing the selected user-selectable process on the image, wherein the selected user-selectable process of the plurality of user-selectable processes comprises an indication to the user to remove the object from a field of view of a camera which captured the image.

11. The method according to claim 10, wherein a second selected user-selectable process of the plurality of user-selectable processes comprises hiding a visual characteristic of a second object of the plurality of objects in the image.

12. A non-transitory computer-readable storage medium storing a program for controlling a computer to perform a method comprising:

receiving an image of a user in an environment;

detecting a plurality of objects in the image, the plurality of objects being associated with different object types, wherein the different object types are associated with a plurality of user-selectable processes;

for each respective detected object of the plurality of objects, presenting, on the image a visual overlay that marks a location of the respective detected object within the image, and a message indicating a user-selectable process of the plurality of user-selectable processes at the location of the respective detected object;

presenting, on the image, a prompt to select a selected user-selectable process from the plurality of user-selectable processes, wherein the prompt is dynamically presented on the image and comprises the message based on an object type of an object of the plurality of objects; and generating a modified image by performing the selected user-selectable process on the image, wherein the selected user-selectable process of the plurality of user-selectable processes comprises an indication to the user to remove the object from a field of view of a camera which captured the image.

13. The non-transitory computer-readable storage medium according to claim 12, wherein a second selected user-selectable process of the plurality of user-selectable processes comprises hiding a visual characteristic of a second object of the plurality of objects in the image.

* * * * *